United States Patent [19]

Llacer et al.

[11] 3,781,612

[45] Dec. 25, 1973

[54] METHOD OF IMPROVING HIGH-PURITY GERMANIUM RADIATION DETECTORS

[75] Inventors: Jorge Llacer, Brookhaven; Hobart W. Kraner, Bellport, both of N.Y.

[73] Assignee: The United States of America as represented by the United States Atomic Energy Commission, Wasington, D.C.

[22] Filed: Mar. 28, 1972

[21] Appl. No.: 238,822

[52] U.S. Cl.... 317/234 R, 317/235 N, 317/235 AQ, 317/235 AD, 250/83.3, 148/1.5, 148/33

[51] Int. Cl. .......... H011 15/00

[58] Field of Search .......... 317/235 N, 235 AQ, 317/235 AD; 250/83.3; 148/1.5

[56] References Cited

UNITED STATES PATENTS

| | | | |
|---|---|---|---|
| 3,527,944 | 9/1970 | Kraner | 250/83 |
| 3,588,505 | 6/1971 | Johnson | 250/83.1 |
| 3,593,067 | 7/1971 | Flynn | 317/234 R |
| 3,624,557 | 11/1971 | DeLoach | 331/107 R |

*Primary Examiner*—Martin H. Edlow
*Attorney*—Roland A. Anderson

[57] ABSTRACT

Method for improving the response characteristics of high-purity germanium radiation detectors by irradiation, annealing and etching the detectors.

9 Claims, 5 Drawing Figures

PATENTED DEC 25 1973

3,781,612

SHEET 1 OF 5

PATENTED DEC 25 1973 3,781,612

SHEET 3 OF 5

METHOD OF IMPROVING HIGH-PURITY GERMANIUM RADIATION DETECTORS

BACKGROUND OF THE INVENTION

This invention was made in the course of, or under a contract with the United States Atomic Energy Commission.

In the last few years lithium-drifted silicon and germanium radiation detectors have become very successful tools for research in very diverse fields. These detectors allow for efficient detection of photons and charged particles over a great range of energies with good resolution. In the area of photon detection, however, the efficiency of silicon becomes much smaller than that of germanium as the photon energy increases. For example, the cross-section for photoelectric effect, which is proportional to $Z^5$, is approximately 60 times higher in Ge than in Si. In the area of charged particle detection, germanium also has an advantage over silicon at the higher energies available from small accelerators, since the depletion layer of Si necessary fully to stop a particle is difficult to achieve. For example, 40 MeV protons have a range of approximately 9 mm in Si, but only 5 mm in Ge. Since germanium also requires slightly less energy for the formation of electron-hole pairs, germanium has an advantage in almost all spectrometry applications.

Heretofore, lithium drifted germanium detectors have been difficult to make or use successfully. For example, special precautions have been necessary to prevent Li precipitation. Accordingly it has been advantageous to provide high purity germanium radiation detectors. In this regard, these high purity germanium radiation detectors have impurity concentrations of less than 1 part per trillion for *p* and *n*-type impurities, and are of interest with impurity concentrations of $< 5 \times 10^{10}/\text{cm}^3$. It is additionally advantageous to provide a method for making high purity germanium radiation detectors, wherein a desired structure is provided, e.g. in the portion of the bulk germanium, where trace amounts of other impurities, such as Cu, are present. In this regard, it will be noted that high purity germanium radiation detectors employ an applied voltage that determines the depth of the depletion layer. Since the impurity concentration in the thin *p* or *n* contacts is much higher than in the bulk of the material, one can calculate the depletion layer thickness with the well known "abrupt junction" approximation. Also, assuming the impurity concentration is uniform in the germanium radiation detector crystal, the thickness *W* of the depletion layer for a germanium radiation detector of the cylindrical planar diode type is given approximately by $$W = (2\,\epsilon\, v/qN)^{1/2}$$

where *V* is the applied reverse voltage, *N* is the impurity density in the bulk of the material, $\epsilon$ is the dielectric constant of germanium, and *q* is the electronic charge. FIG. 1 of BNL 15910 gives a nomograph for finding the depletion depth as a function of the applied voltage and the impurity concentration.

It is an object of this invention, therefore, to provide a high purity germanium semi-conductor radiation detector;

It is also an object to provide a cylindrical planar high purity germanium radiation detector;

It is a further object to provide a Ge co-axial radiation detector;

It is a still further object to provide a method for processing high purity germanium radiation detectors by controlling their physical and atomic structure.

SUMMARY OF THE INVENTION

This invention provides high purity germanium radiation detectors of the desired types having matrix impurity concentrations of $< 5 \times 10^{10}/\text{cm}^3$. More particularly, it has been discovered in accordance with this invention that desired resolutions and/or other desired characteristics, such as the control of impurities behaving like acceptor traps, can be achieved and/or improved in such high purity germanium radiation detectors by the method of this invention. In accordance with one embodiment, the method of this invention, comprises irradiation with an integrated dosage of neutrons above the threshold for resolution damage, followed by a controlled annealing and etching. With the proper selection of steps as described in more detail hereinafter, the desired high purity germanium radiation detectors are achieved.

The above and further novel features and objects of this invention will become apparent from the following detailed description of three embodiments of this invention when read in connection with the accompanying drawings, and the novel features will be particularly pointed out in the appended claims.

BRIEF DESCRIPTION OF THE DRAWINGS

In the drawings, where like elements are referenced alike.

DESCRIPTION OF PREFERRED EMBODIMENT

Figure 1:
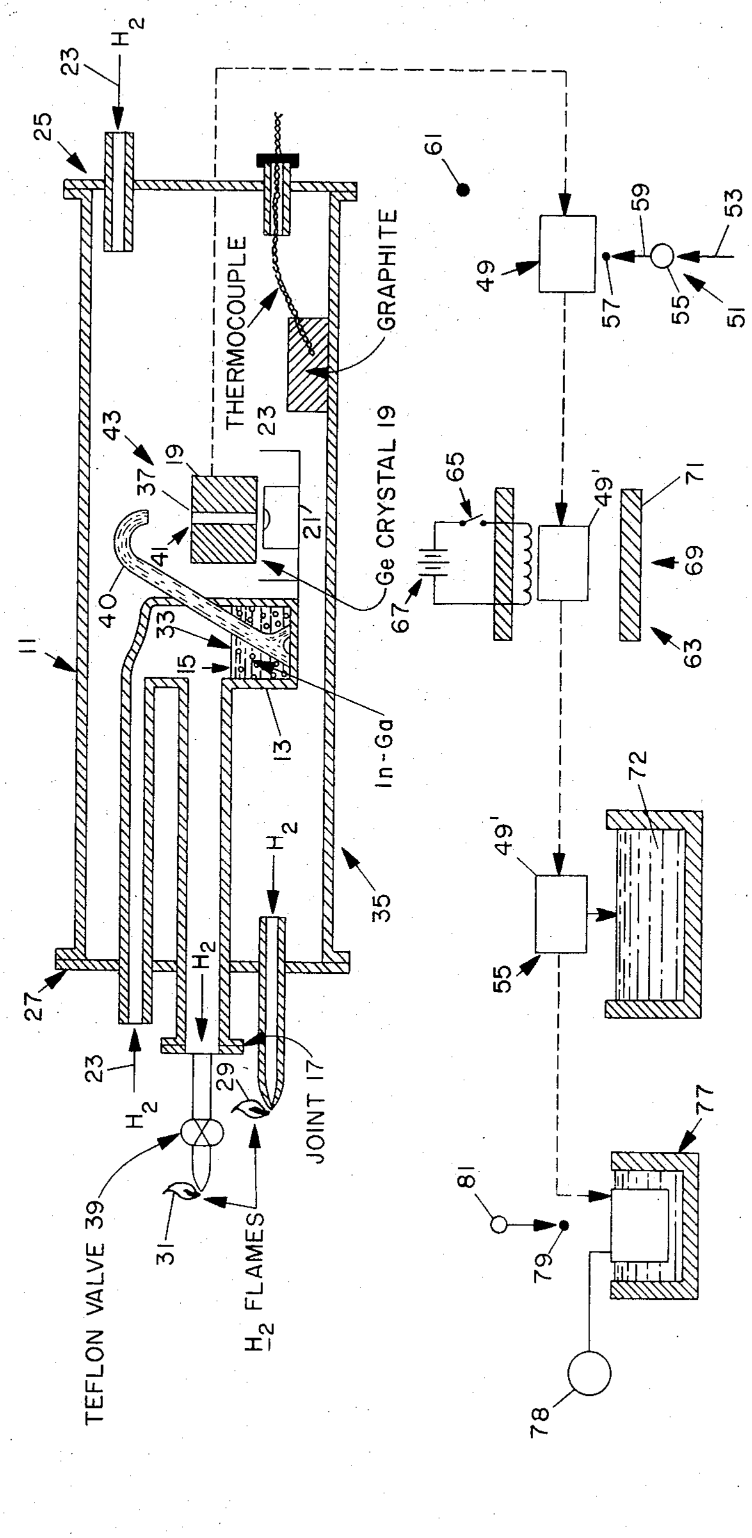
FIG. 1 is a partial schematic drawing of one embodiment of the apparatus for making high purity germanium radiation detectors in accordance with the method of this invention.

This invention is useful in providing high purity germanium radiation detectors having a majority of germanium and a minority of impurities, wherein the matrix impurity concentration is $< 5 \times 10^{10}/\text{cm}^3$. As understood in the art, *p* and *n* type contacts, such as Li $n^+$ or suitable In - Ga contacts may be used. The amounts of trace impurities, in the crystals, comprise less than 1 part pertrillion of such elements as Cu, but trace amounts of Mn or Au, Co or Ni may also be present. As such, the detector of this invention is useful generally in the field of radiation detection for any of the applications to which the previously known semiconductor radiation detectors have been employed. For example, the germanium detectors of this invention are useful in detecting photons and/or charged particles, and/or in stopping the same in the germanium processed in accordance with this invention. Thus, while not limited thereto, this invention is particularly useful in providing germanium radiation detectors for a wide range of spectrometry applications. To this end, in accordance with this invention the detectors are irradiated above their threshold for degradation of their resolution characteristics, and this damage is recovered in accordance with the damage-recovery cycle of this invention. To this end, in accordance with this invention, it has been discovered that the dosage required is an integrated dose of $10^{10}$n/cm$^2$. Also, it is believed that the trace impurities, which advantageously have a uniform concentration gradient in the germanium, can cause deep acceptor levels capable of behaving like acceptor traps, and these are removed in accordance with the irradiation and annealing steps of this invention.

Recently, ultra high purity germanium crystals have become available having impurity concentrations of less than 1 part per trillion for use in connection with the detection of photons and/or charged particles. As described in BNL 16142 and 15910, high purity germanium crystals having impurity concentrations of $< 5 \times 10^{10}$/cm$^3$ have been produced. In this regard, the crystals comprise a majority of Ge with minority impurity concentrations less than 1 part per trillion. Heretofore, the suggestion was made that acceptor levels formed in the band gap of the Ge by gamma irradiation could be used to compensate the remaining donor impurities. However, no good detectors made by this method have ever been reported before this invention.

In accordance with this invention, starting with commercially available *n* and/or *p* type ultra high purity germanium crystals having impurity concentrations of $< 5 \times 10^{10}$ cm$^3$, comprising trace impurities, such as Cu, a substantial number of planar and/or co-axial high purity germanium detectors have been made with volumes of approximately between 2.4 and 5.6 cm$^3$, thickness between 2 and 3.5 mm and areas between 1 and 3.15 cm$^2$. To this end, the detectors were irradiated, annealed and etched in accordance with the method of this invention.

Referring now to FIG. 1 a system is shown for providing *p* type contacts on the pure germanium crystals.

To this end, for example, furnace 11 provides a reservoir 13 filled with In — Ga (100:1) pellets 15, 99.999% pure, filled through flange-joint 17. With the above-described commercially available *n* or *p*-type high purity germanium crystal 19 having impurity concentrations of $< 5 \times 10^{10}$cm$^3$ removed from its holder 21, the furnace 11 fires to 800° C. in a flow 23 of $H_2$ coming into the furnace 11 from both sides 25 and 27, with outlet flames 29 and 31 both lit on side 27. When the In — Ga oxides reduce, the mixture thereof in reservoir 13 presents a clean appearance, the furnace 11 cools until below 150° C, when solidification of the In — Ga mixture 33 occurs. The system 35 then opens, allowing the flow of $H_2$ into the In — Ga reservoir 13 to continue (flame on), but turning off the other $H_2$ stream 23 for safety reasons. The Ge crystal 19, with a core 37 drilled out with an ultrasonic cutter, etched and rinsed in high resistivity water, then attaches to its holder 21, and the system 35 closes again. With both $H_2$ flames 29 and 31 lit, the temperature in furnace 11 rises to 360° C, and at that time Teflon brand polytetrafluoroethylene valve 39 closes. Thereupon, hydrogen pressure slowly pushes molten In — Ga up the pouring spout 40 to drip the molten In — Ga 33 into the hollow core 37. At completion, valve 39 opens again, the flame 29 lights, and the temperature cycle described again initiates. When the device comes out of furnace 11, the In — Ga mixture 33 in core 37 flows off, and after cooling to room temperature, HCL removes the excess In — Ga. The surface of the $p^+$ contact 41 appears quite rough and not necessarily uniform, but this contact 41 has low resistivity and is noninjecting with the field developed at the $p$–$p^+$ interface 43. An evaporation and diffusion method is used to provide Li $n^+$ contacts. This method is well known in the detector industry. Accordingly, the crystals 19 with suitable $p^+$ contacts 41 thereon formed in system 35 and suitable $n^+$ contacts, are ready for initial preparation for providing the finished detectors of this invention. In this regard, the *n* and/or *p*-type purity germanium crystals 19 having suitable contacts thereon, are referred to hereinafter as detector devices. As such, commercially available detector devices can be used in accordance with this invention.

Figure 2:
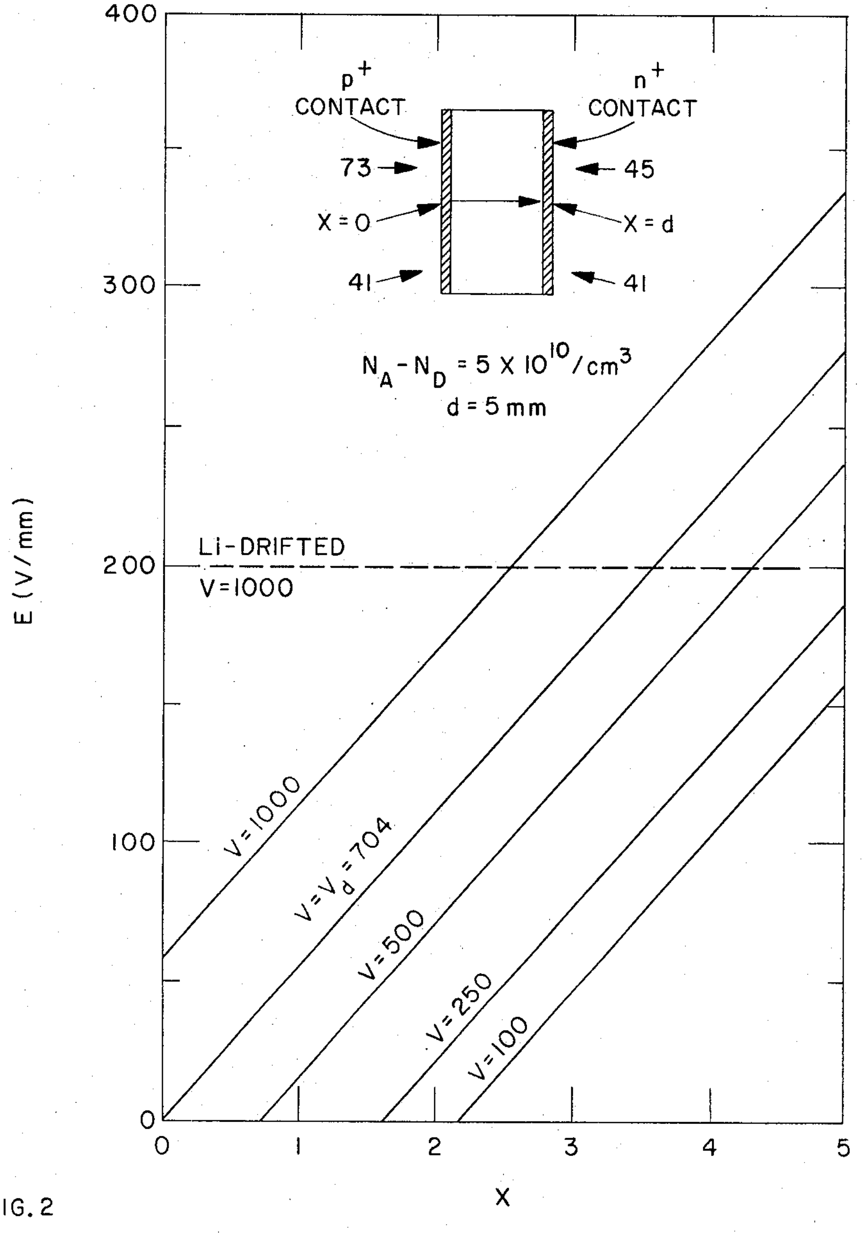
FIG. 2 is a partial cross-section of a cylindrical planar germanium radiation detector embodiment made with the apparatus of FIG. 1, showing a graph of some characteristics of such planar detectors.
Figure 3:
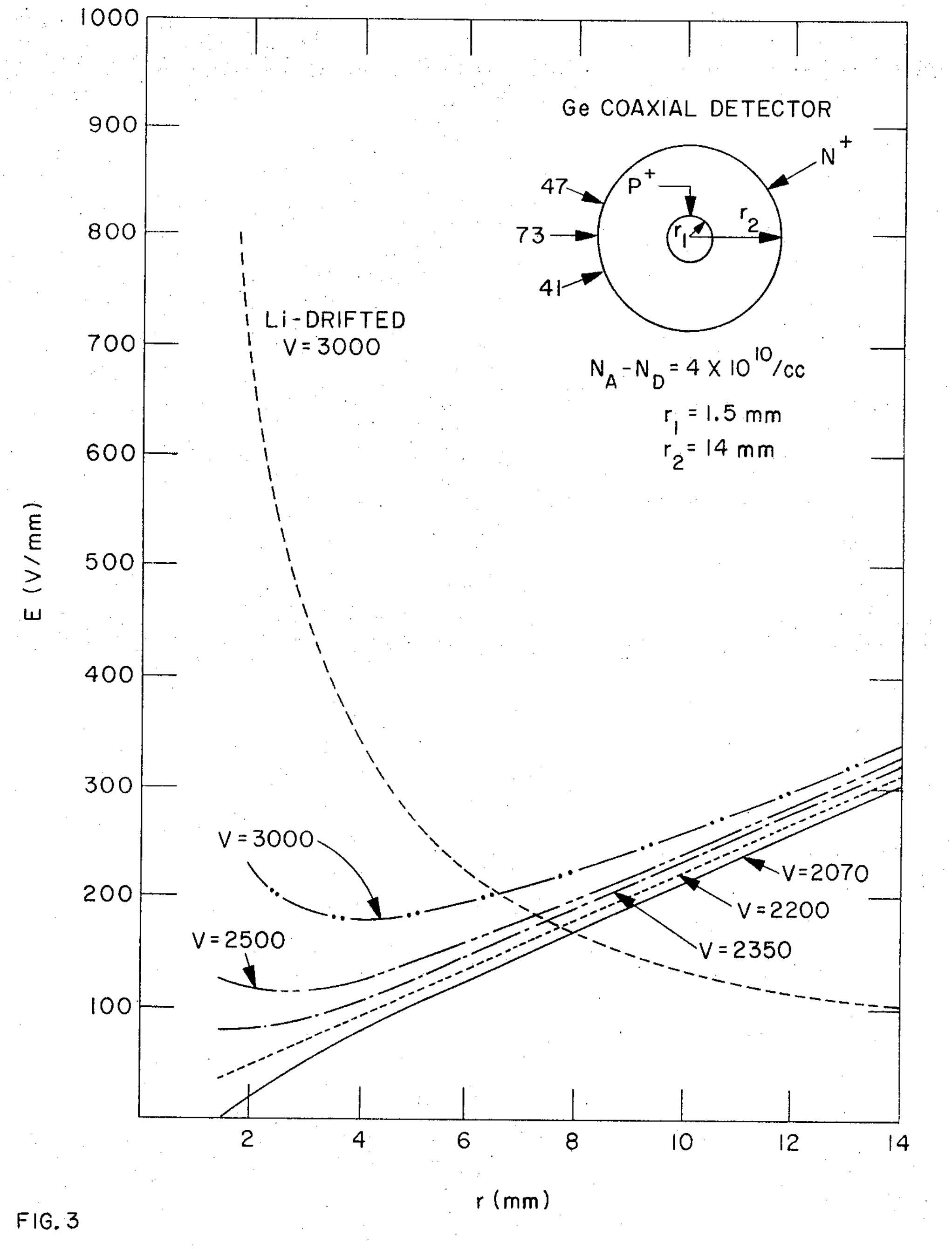
FIG. 3 is a partial cross-section of a cylindrical co-axial germanium radiation detector embodiment made with the apparatus of FIG. 1, showing a graph of some characteristics of such co-axial detectors.

Only the simplest procedures are required for the initial preparation of the *n* and/or *p*-type crystals 19 having contacts 41 thereon as described above, both for providing the cylindrical planar detector 45 of FIG. 2 and the cylindrical co-axial detector 47 of FIG. 3, which are referred to herein after generally as detectors 48 for ease of explanation. To this end, lapping removes spill over In — Ga (or Li) from contacts 41 and black wax protects the surface of the contacts 41. Also, the above-referred to detector devices, e.g., the high purity germanium radiation detector devices 49 made with contacts 41 in the system 35 of FIG. 1 as described above, are etched in $H_2O_2$ — HF (1: 1) for a few minutes. Rinsing with de-ionized water and methanol follows, and $C_2HCl_3$ (electronic grade) removes the wax.

To process these high purity germanium detector devices 49 of this invention, the device 49 may be sliced to form detector device 49 segments irradiated, annealed and etched in accordance with this invention. In this regard, for example, five high purity, impurity doped germanium radiation detector devices 49 as described above, ranging in thickness between 2 and 3.5 mm, and having areas between 1 and 3.15 cm$^2$, were irradiated by source 51.

The starting material of crystal 19, was commercially available ultra high purity germanium having only trace amounts of impurities such as Cu. Three detectors, 384–2, 319–4 and **220–4–*b*, were made from n-type material with contacts diffused (e.g., in furnace 11 or another furnace) at approximately 400°C. The other two detectors, 373–1 and 437–1**, were manufactured from *p*-type material, with reduced temperature. Table 1 shows the initial characteristics of these devices 49, as well as changes due to irradiation and annealing, as discussed in more detail hereinafter. Two Hall effect samples, as understood in the art, were prepared from different slices of *n*-type crystal 384. One of them (384–3) was from a section that had been heated to 300°C for 72 hours, after which a detector was fabricated with 400°C contacts 41. However, this detector showed poor resolution, tailing, and the material was then p-type. The second Hall sample (384–6) was made from an unheated section. Hall sample processing involved etching and placing ohmic contacts at about 150° - 175°C. Tables 2 and 3 show initial characteristics of these two Hall samples, as well as other results discussed hereinafter.

In accordance with this invention, it has been discovered that energy resolution of the devices 49 noticeably degrades from neutron irradiation having various or several energy levels, or an integrated flux of $\approx 10^{10}$ n/cm$^2$. However, by annealing and etching irradiated devices 49, e.g., high purity Ge planar devices 49 or co-axial devices 49 irradiated at an integrated flux of $\approx 10^{10}$ n/cm$^2$ in processing the same to produce detectors 48, this degradation was at least and/or more than recovered to the initial resolution characteristics levels before the irradiation. For example, a right circular cylindrical planar device 49 having flat parallel ends was irradiated from a fast neutron source 51, such as provided by the $^7$Li $(p, n)^7$ Be reaction at the 3.5 MeV Brookhaven Electrostatic Accelerator. To this end, for example, proton beams 53 of $\approx 10\mu$ a at 3.30 MeV impacted against a 1 mg/cm$^2$ target 55 to give copious mono-energetic neutrons 57 of 1.6 MeV in the forward direction, as indicated by arrow 59. Advantageously, the devices 49 were placed about 3.5 cm from target 55 in the forward or 0° directon. Also, the neutron flux was monitored with a long counter 61 placed 1.2 m from the target 55 about 20° off the forward direction for all measurements. Additionally, an 0.61 Ci PuBe neutron source was placed at the position of target 55 for calibrations. The calibration was performed with a germanium detector in place to give a flux measurement with an error (fractional standard diviation) of 30 percent.

After irradiation, the irradiated device 49' is advantageously annealed to 250°C. To this end, a conventional thermostatically controlled oven 63 may be used, as long as it has a suitable control 65 and a power source 67, illustrated as a battery for ease of explanation, for maintaining the desired temperature. Also, means 69, having a suitable chamber 71, maintains a desired atmosphere in chamber 71 around the device 49' during annealing. One suitable atmosphere is air in chamber 71 of oven 63 at atmospheric pressure. After each annealing step, the devices 49 produced by the described method were etched and then tested in a fast cycling cryostat following certain procedures, as described in more detail hereinafter.

Figure 4:
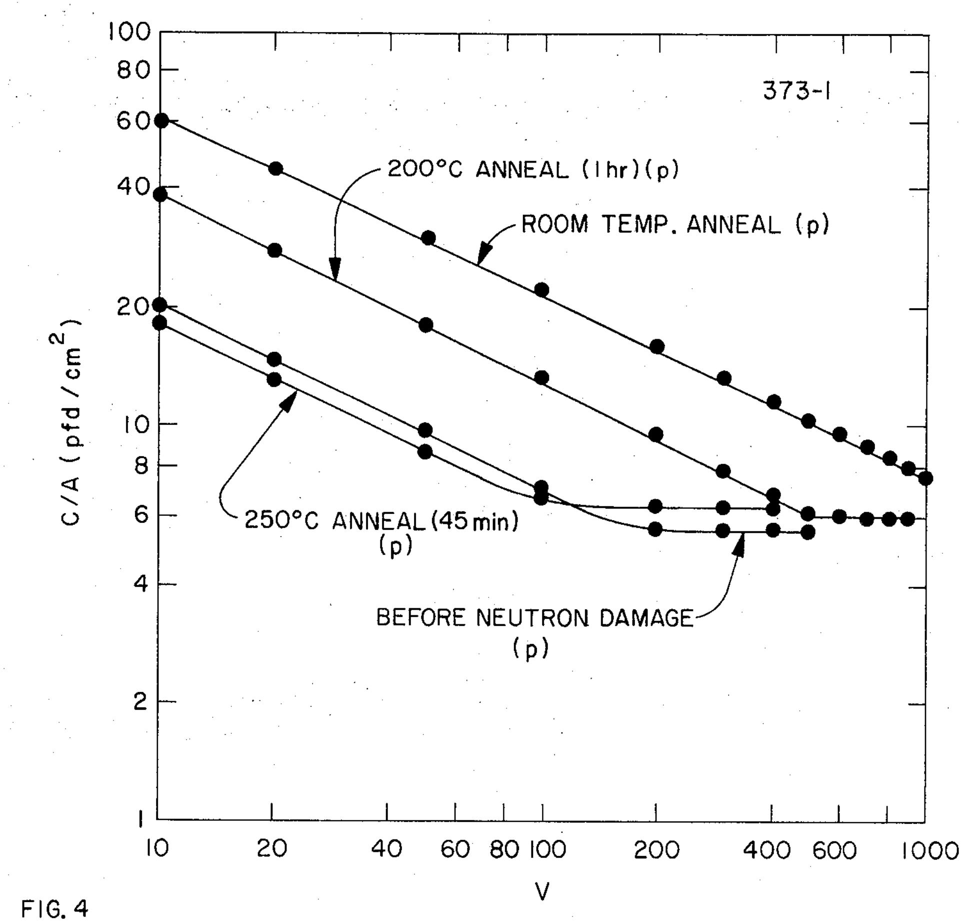
FIG. 4 is a graphic representation of some anneal characteristics of the high purity germanium detectors of this invention.

As shown in FIG. 4, sequentially annealing at room temperature and at 200°C, recovers much of the degradation in device 49 produced by neutron irradiation from source 51. However, only annealing at 250° for from between 45 minutes and one hour recovers substantially all the degradation. Such recovery is shown by the resolution measurements illustrated in FIG. 4. Moreover, as shown by FIG. 4, the resolution is improved by annealing at 250°C for 45 minutes. Higher temperatures and longer annealing times, are not desirable, as they may produce undesirable secondary effects, and/or they are inefficient.

In understanding this annealing effect, in which the recovered device 49' exhibits better resolution than before the above-described damage-anneal cycle of this invention, this effect has been investigated by Hall effect measurements on the two above-mentioned samples. As a result, it was discovered that the described sequential damage-anneal cycle resulted in the change of the electrical properties of deep acceptor levels caused by the above-described trace impurities, to the effect that they ceased behaving like ionized acceptor traps.

Figure 5:
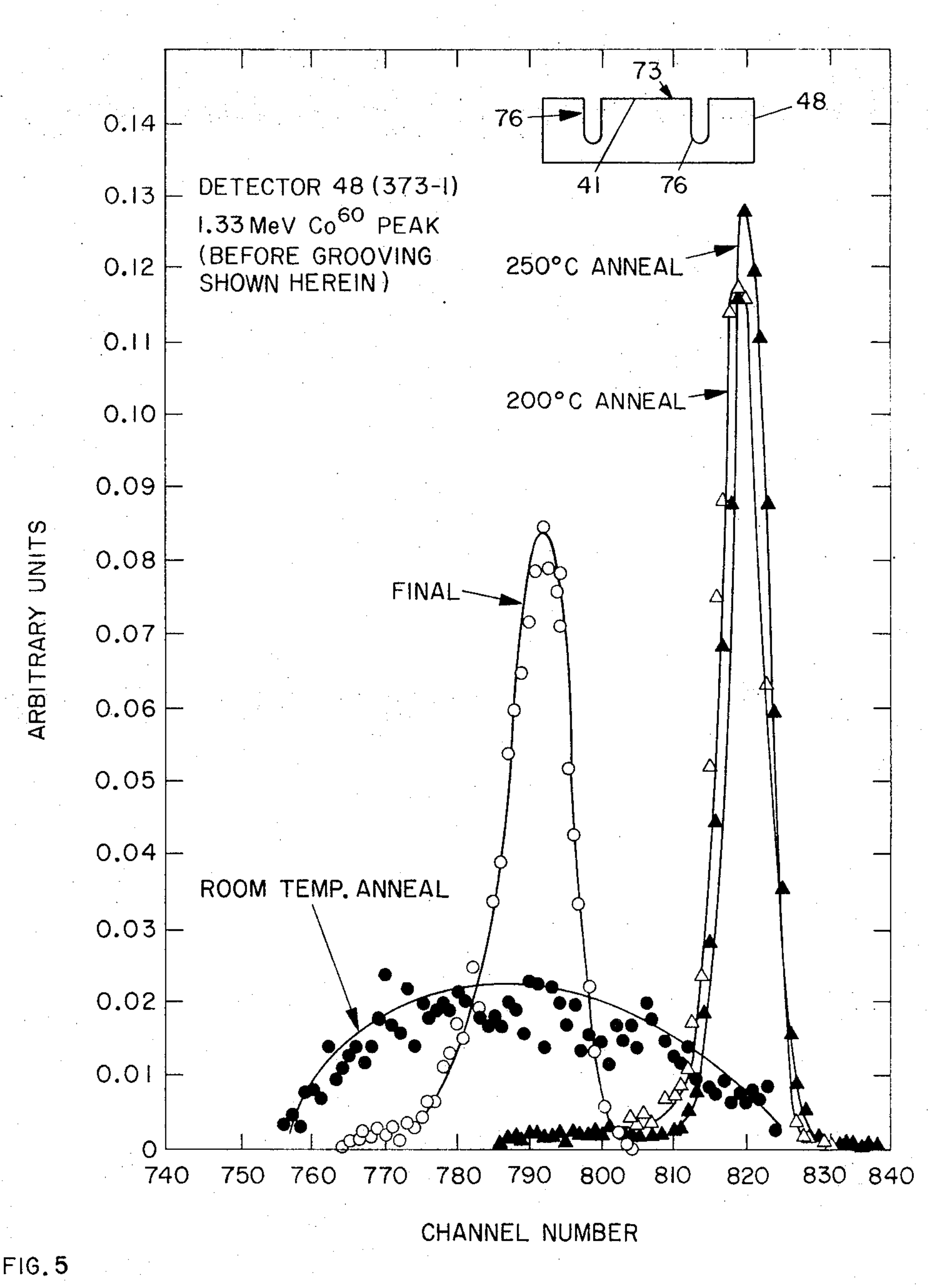
FIG. 5 is a partial cross-section of an annular grooved embodiment of the cylindrical planar detector of FIG. 2, showing a graphic representation of detector characteristics of detectors annealed at various temperatures.

Advantageously, after each annealing step in oven 63, the annealed device 49' is etched in a bath 72 of $H_2O_2$ — HF (1:1) to finish the surface 73 of the annealed device 49' for providing the finished detector 48. In this regard, it can be cited here, that experience has shown that surfaces 73 of both planar and co-axial devices 49 produced by the apparatus 75 of the described system 35, may require better vacuum handling than customary with Li-drifted germanium detectors, except in the case of high purity germanium planar detectors 48 having an annular grooved geometry 76. As shown in FIG. 5, this geometry resembles the grooved geometry described in U.S. Pat. No. 3,413,528, and/or the above-identified BNL publication by the inventor hereof. In this regard, the grooves 76' have the same function, i.e., of providing high electrical resistance on the $p$ and $n$ faces 76'' of the diodes 48' formed by the grooved detectors 48. As will be understood in the art in the operation and testing of non-grooved detectors 48, initial pumping at 77°K in a cryostat 77 for detector 48 may be desired with good diffusion pumps 78, while out-gassing of charcoal or molecular sieve material (not shown for ease of explanation) is being carried out at a slow pace for detecting photons or charged particles 79 from source 81. Moreover, an asset of the detectors 48 of this invention is that for a "clean" vacuum system, such as described, cryogenic cooling is only required during operation of these detectors, and not during storage as with lithium drifted units.

Table I shows the effective carrier concentration and type obtained for the five above-mentioned detectors 48 after each annealing step in oven 63, as well as the corresponding contribution by the detector to line width for 1.33 MeV $y$-rays. FIG. 5 shows the spectra corresponding to detector 373–1 during the above-described recovery process of this invention.

It will be noted from FIGS. 4 and 5, as well as the Tables, that a 45 minute annealing step at 250°C or at temperatures from room temperature ambient, through 200°C to 250°C with etchings in between each step and testing at 77° K resulted not only in recovery of the initial resolution characteristics but an actual improvement over that resolution. This was common to all the detectors 48, as shown in Table I. After the final anneals, detectors 373–1, 319–4 and 437–1 showed a lower hole concentration in the bulk material (as obtained from C-V characteristics like the V values obtained and shown in FIGS. 2 and 3) than before irradiation by source 51. Detector 384–2, initially $n$-type, had a higher electron concentration after the second damage-anneal cycle than after the first one, while detector 220–4–$b$, made from material initially $n$-type, was $p$-type after detector manufacture and ended with a lowered carrier concentration (type not measureable because of very low depletion voltage after the cycle). This observed phenomena, it is believed, can be explained for the five detectors on the basis that the described damage anneal cycle results in the disappearance of deep acceptor levels. In this, the bulk material changes concentration towards more $n$-type, as understood from the above example, and resolution improves by the disappearance of trapping centers. Also, FIG. 4 shows capacity per unit area for detector 373–1 before neutron damage and after the different annealings illustrated. The behavior, again, is typical and the detector 48 is found to be more easily depleted after the damage-anneal cycle than before it.

Referring again to Table 2, in $n$-type sample 384–6, the experimental results before irradiation from source 51 showed a small step at approximately $1/T \approx 0.0074$, which analysis shows corresponds to a level of $E_V +$ 0.45 $eV$ or $E_c - 0.26$ at a corresponding temperature. This level can easily be identified as the top level of the triple acceptor Cu , which is a deep trace impurity in the high purity germanium material of the crystal 19 from which the devices 49 and the detectors 48 were made. One can then infer that there exist twice as many acceptor states (also due to Cu) below the center of the band gap as there are above. The total shallow donor concentration is then obtained by adding the value of $n$ at a temperature just above the step due to Cu to the concentration of ionized acceptor levels in that temperature region. The donor concentration obtained is $1.58 \times 10^{11}$ $cm^{-2}$ and this is the number used throughout the analysis. Table 2 shows the acceptor concentration after irradiation from source 51 and subsequent anneals in oven 63 are obtained directly from the analysis of experimental results and the donor concentration calculated.

Irradiation from source 51 results in an increase in the concentration of acceptor levels below the center of the gap (whose energies cannot be measured in $n$-type material), the appearance of a group of levels distributed between 0.4 and 0.44 $eV$ and a new level at 0.51 $eV$ (acceptor levels measured from $E_V$). It is assumed that the concentration of electrically active shallow donors does not change with irradiation. If this assumption is not correct, corrections would become necessary in the second and third columns of Table 2, but the concentration and energies of the states observed directly remain unchanged. Other states, cannot be explored without going to lower temperatures. The sequential annealing steps of this invention at sequentially increased temperature increments, results in a progressive decrease in the concentration of all the acceptor states. In this regard, after the described 250°C anneal, there remain more acceptor states in the sample than there were before irradiation, but interestingly and surprisingly the step due to Cu has disappeared as far as can be determined from the accuracy of the measurement.

Referring now to Table 3 for a discussion of $p$-type sample 384–3, this crystal 19 was expected to contain a substantial number of diffused impurities due to a 72-hour heating at 300°C. In the case of $p$-type crystals 19 referred to herein, the region between just below the middle of the band gap and down to about $E_V + 0.14$ $eV$ can be explored, i.e. the region of deep acceptors below the band gap center. Before irradiation damage from the neutrons from source 51, well populated acceptor levels at 0.16, 0.24, and 0.32 $eV$ were found in the mentioned sample crystal 19. They have been tentatively identified as belonging to Mn, or Au, Co or Ni and Cu, respectively. From the expected donor concentration of the starting material of the doped crystal 19 for the slice of crystal 384 (approximately $5 \times 10^{10}cm^{-3}$) one can infer the total population of shallow acceptors. Neutron irradiation of the crystal 19 of this device 49 from source 51 resulted in some slight shifts in the energies and a decrease in the population of nearly all the acceptor states. Annealing in accordance with the sequential, incrementally increasing temperature steps of this invention described above, results in some small energy shifts but very markedly in a decrease in the concentration of all the acceptor states, i.e., the material becomes purer in an electrical sense. Again it is assumed that irradiation and annealing do not change the concentration of shallow donors.

The observations from the above-mentioned two preliminary measurements are in agreement with the results obtained with the radiation detectors 48. In this regard, impurities that behave electrically as acceptors before neutron irradiation from source 51 lose that character after the described irradiation-anneal cycle. Clearly, this phenomenon is of considerable interest both from the basic and applied physics point of view.

In review of the above, it has been discovered in accordance with this invention that the described high purity germanium radiation detector devices 49 exhibit deterioration of resolution after integrated neutron doses from source 51 of approximately $10^{10}$ fast neutrons per $cm^2$. This is very similar to results obtained with Li-drifted devices. There is a possibility, however, that the rate of deterioration with dose above $10^{10}$ $n/cm^2$ is lower with very pure crystals having less trace impurities than those described. Annealing of the damaged detectors is quite simple, requiring only heating to 250°C for a period of approximately 1 hour and re-etching. Because of the high sensitivity of the detector surface 73 to ambient conditions it seems unlikely that the described annealing can be carried out in the detector holder 21 in which it is used, but with the proper design this cannot be ruled out. The described damage and annealing cycle, if anything, results in improvement of detector characteristics by changing the electrical characteristics of deep acceptor traps. There is no information at this time as to how many times the described damage-anneal cycle of this invention can be repeated without permanent damage to the crystal 19 or temporary damage to a Li $n^+$ contact therefor, which could be redone if necessary.

TABLE 1

| Diode | Treatment | Carrier concentration and type, 77° K. | Resolution, FWHM $Co^{60}$ source, KeV (detector contribution) | Comment |
|---|---|---|---|---|
| 373–1 | Before damage | $4–5\times10^{10}$, p | <2.36 | Initially p-type. |
| | Damage and 20° C. anneal | $5\times10^{11}$, p | 18.0 | $4\times10^{10}$ neut./cm.². |
| | 200° C. anneal (1 hr.) | $1.7\times10^{11}$, p | 2.0 | |
| | 250° C. anneal (45 min.) | $4\times10^{10}$, p | 1.31 | |
| 384–2 | Before damage | $2\times10^{10}$, ? | >2.8 | Initially n-type. |
| | Heavy neutron damage and 200° C. anneal (1 hr) | $2–3\times10^{10}$, n | 2.77 | |
| | Damage and 20° C. anneal | $2.5\times10^{11}$, p | 29.1 | $2\times10^{10}$ neut./cm.². |
| | 200° C. anneal (1 hr.) | $2–3\times10^{10}$, p | 3.35 | |
| | 250° C. anneal (45 min.) | $5.8\times10^{10}$, n | 2.1 | |
| 319–4 | Before damage | $7–9\times10^{10}$, p | 2.15 | Initially n-type, tailing. |
| | Damage and 20° C. anneal | $2\times10^{11}$, p | 19.6 | $3\times10^{10}$ neut./cm.². |
| | 200° C. anneal (1 hr.) | $9\times10^{10}$, p | 2.99 | |
| | 250° C. anneal (45 min.) | $4.4\times10^{10}$, p | 1.93 | Some tailing. |
| | 275° C. anneal (30 min.) | $5–6\times10^{10}$, p | | Still some tailing. |
| 220–4–b | Before damage | $2.9\times10^{10}$, p | 1.7 | Initially n-type. |
| | Damage and 250° C. anneal (2 hrs.) | $1.4\times10^{10}$, ? | 1.2 | $4\times10^{10}$ neut./cm.². |
| 437–1 | Before damage | $8\times10^{10}$, p | 1.9 | Initially p-type. |
| | Damage and 250° C. anneal (2 hrs.) | $5.5\times10^{10}$, p | 1.7 | $6\times10^{10}$ neut./cm.². |

TABLE 2

[Crystal 384, sample 6, unheated, except for low-temperature n-type ohmic contacts]

| Treatment | Donor concentration (shallow) | Acceptor concentrations and levels (above valence band) | |
|---|---|---|---|
| | | Below $E_{gap}/2$ | Above $E_{gap}/2$ |
| Before neutron damage | $1.58\times10^{11}$ (cm.$^{-3}$)* | $2.8\times10^{10}$ (cm.$^{-3}$)* | $1.4\times10^{10}$ (cm.$^{-3}$) at .45 ev. |
| After $3\times10^{10}$ neut./cm.$^2$ | $1.58\times10^{11}$* | $7.2\times10^{10}$* | $3.8\times10^{10}$ distributed .4 to .44 ev., $.7\times10^{10}$ at .51 ev. |
| 100° C. anneal (90 min.) | $1.58\times10^{11}$* | $6.9\times10^{10}$* | $3.2\times10^{10}$ distributed .4 to .44 ev., $.7\times10^{10}$ at .51 ev. |
| 200° C. anneal (60 min.) | $1.58\times10^{11}$* | $5.2\times10^{10}$* | $1.7\times10^{10}$ distributed .4 to .44 ev., $.52\times10^{10}$ at .51 ev. |
| 250° C. anneal (45 min.) | $1.58\times10^{11}$* | $3.26\times10^{10}$* | $1.7\times10^{10}$ distributed .4 to .44 ev., $.33\times10^{10}$ at .51 ev. |

*Inferred (see text).

TABLE 3

[Crystal 384, sample 3, annealed for 72 hrs. at 300° C. in air Detector fabricated, Hall sample cut from it, low temperature p-type ohmic contacts made]

| Treatment | Donor concentration (shallow) | Acceptor concentrations and levels (above valence band) | |
|---|---|---|---|
| | | Shallow (below .14 ev.) | Deep (above .14 ev.) |
| Before neutron damage | *$.5\times10^{11}$ (cm.$^{-3}$) | *$1.85\times10^{12}$ (cm.$^{-3}$) | $.6\times10^{11}$ at .16 ev., $1\times10^{11}$ at .24 ev., $1\times10^{11}$ at .32 ev. |
| After $3\times10^{10}$ neut./cm.$^2$ | *$.5\times10^{11}$ | *$1.66\times10^{12}$ | $.48\times10^{11}$ at .17 ev., $.85\times10^{11}$ at .25 ev., $1\times10^{11}$ at .3 ev. |
| 200° C. anneal | *$.5\times10^{11}$ | *$1.62\times10^{12}$ | $.48\times10^{11}$ at .17 ev., $.35\times10^{11}$ at .24 ev., $.5\times10^{11}$ at .29 ev. |
| 250° C. anneal | *$.5\times10^{11}$ | *$1.1\times10^{12}$ | $.4\times10^{11}$ at .165 ev., $.1\times10^{11}$ at .22 ev., $.5\times10^{11}$ at .29 ev. |
| 275° C. anneal | *$.5\times10^{11}$ | *$.9\times10^{11}$ | $.42\times10^{11}$ at .165 ev., $.1\times10^{11}$ at .22 ev., $.5\times10^{11}$ at .29 ev. |

*Inferred (see text).

This invention has the advantage of providing planar and co-axial germanium radiation detectors. Moreover, by controlled irradiation and anneals followed by etching good and/or improved resolution is achieved. In this regard, this invention has the advantage of providing the desired physical electrical and/or other properties, such as internal structural and/or molecular changes.

What is claimed is:

1. Method for processing a high purity bulk germanium gamma radiation detector containing deep level chemical impurities, comprising metal atoms selected from the group consisting of Li, Cu, Mn, Au, Co, and Ni, where the net amount of said deep level chemical impurities in said bulk germanium gamma radiation detector is less than $5\times10^{10}$ atoms/cc but wherein said deep level chemical impurities can act electrically as acceptors that behave as deep ionized acceptor traps, comprising the steps of:

a. irradiating a target with 3.5 MeV protons to produce mono-energetic neutrons at an energy of about 1.6 MeV in a forward direction by a neutron producing reaction in said target;

b. placing said bulk germanium gamma radiation detector adjacent to said target in the path of said mono-energetic neutrons;

c. irradiating said bulk germanium gamma radiation detector with said mono-energetic neutrons up to an integrated dosage of at least $10^{10}$ n/cm$^2$ to produce radiation damage defects in the germanium in said bulk germanium gamma radiation detector, said radiation damage defects being capable of changing the electrical properties of said acceptors in accordance with the integrated dosage of the neutron irradiation and the shifting of said radiation damage defects in the bulk germanium of said bulk germanium gamma radiation detector;

d. annealing the irradiated bulk germanium gamma radiation detector in a gas ambient for a time interval of at least 45 minutes at a temperature of between about 200° to 250°C to effect the shifting of said radiation damage defects to cause the apparent disappearance of at least some of said acceptors by changing their capability to behave as ionized acceptor traps; and e. finishing the surface of said bulk germanium gamma radiation detector by etching.

2. The method of claim 1 in which said annealing is at 250°C for one hour.

3. The method of claim 1 in which said irradiation is with fast neutrons having an integrated dose of $10^{10}$ n/cm$^2$.

4. Method for processing a high purity impurity doped germanium radiation detector, comprising the steps of:

a. irradiating said detector with an integrated dosage of neutrons above the threshold for degradation of the resolution characteristics of said detector; and b. annealing said irradiated detector at a high enough temperature for a sufficient length of time for effecting the recovery of said degradation to a point at least where said recovered resolution equals the initial resolution of said detector before said irradiation.

5. The method of claim 4 in which said annealing step is followed by etching of the surface of said detector.

6. The method of claim 5 in which said irradiation is with fast neutrons having an integrated dosage of $10^{10}$ n/cm$^2$, and said annealing is at 250°C for about 1 hour.

7. High purity bulk germanium gamma radiation detector having deep level chemical impurities, comprising metal atoms selected from the group consisting of Li, Cu, Mn, Au, Co and Ni, where the net amount of said deep level chemical impurities is less than $5 \times 10^{10}$ atoms/cc but wherein said deep level chemical impurities can act electrically as acceptors that behave as deep ionized acceptor traps, comprising:

a. bulk germanium having radiation damage defects capable of changing the electrical properties of said acceptors; and b. acceptors whose electrical properties have been changed by shifts in at least some of said radiation damage defects;

said radiation damage defects and shifts thereof in said bulk germanium being sequentially produced by neutron irradiation and by annealing respectively at incrementally increasing temperature steps.

8. The detector of claim 7 having a germanium bulk material formed with parallel planar ends in an annular grooved geometry.

9. The detector of claim 7 having a germanium bulk material forming respective cylindrical co-axial inner and outer $p^+$ and $n^+$ regions.

* * * * *